(12) United States Patent
Colussi et al.

(10) Patent No.: US 9,104,209 B2
(45) Date of Patent: Aug. 11, 2015

(54) AUTONOMOUS VALVE ASSEMBLY FOR THE REGULATION, DEPRESSURIZATION AND PRESSURIZATION OF PNEUMATIC EQUIPMENT

(75) Inventors: Rafael A. Colussi, Santa Fe (AR); Nestor J. Venica, Santa Fe (AR)

(73) Assignee: Col-Ven S.A., Sante Fe (AR)

( * ) Notice: Subject to any disclaimer, the term of this patent is extended or adjusted under 35 U.S.C. 154(b) by 63 days.

(21) Appl. No.: 14/119,052

(22) PCT Filed: May 20, 2011

(86) PCT No.: PCT/IB2011/001086
§ 371 (c)(1),
(2), (4) Date: Nov. 20, 2013

(87) PCT Pub. No.: WO2012/059800
PCT Pub. Date: May 10, 2012

(65) Prior Publication Data
US 2014/0083540 A1    Mar. 27, 2014

(51) Int. Cl.
| | | |
|---|---|---|
| F04B 49/00 | (2006.01) | |
| G05D 16/20 | (2006.01) | |
| B60C 23/00 | (2006.01) | |
| B60C 23/10 | (2006.01) | |

(52) U.S. Cl.
CPC .............. *G05D 16/20* (2013.01); *B60C 23/001* (2013.01); *B60C 23/003* (2013.01); *B60C 23/10* (2013.01); *Y10T 137/86501* (2015.04)

(58) Field of Classification Search
USPC ........ 137/488, 505, 565.11; 141/38; 152/416; 340/442
See application file for complete search history.

(56) References Cited

U.S. PATENT DOCUMENTS

| | | | | |
|---|---|---|---|---|
| 5,293,910 A | * | 3/1994 | Mohs .............................. | 141/38 |
| 5,767,398 A | * | 6/1998 | Naedler ....................... | 73/146.2 |
| 6,484,774 B1 | * | 11/2002 | Naedler ........................ | 152/417 |
| 8,528,611 B2 | * | 9/2013 | Wilson et al. ................. | 152/416 |

FOREIGN PATENT DOCUMENTS

| | | |
|---|---|---|
| DE | 102008062071 A1 | 6/2010 |
| EP | 1265761 A1 | 12/2002 |

OTHER PUBLICATIONS

International Search Report for PCT/IB2011/001086.

* cited by examiner

*Primary Examiner* — Kevin Murphy
*Assistant Examiner* — R. K. Arundale
(74) *Attorney, Agent, or Firm* — Locke Lord LLP; Howard M. Gitten

(57) ABSTRACT

An autonomous valve assembly for the regulation, depressurization and elevation of the pressure in pneumatic equipment that presents a valve body 22 and an air regulator body 4 with a compressed air intake 54 connected to a source of compressed air, whereby the body 4 presents two pressure regulators 45, 46 that regulate the pressure at a desired level and communicate it to an air diverter plunger 6 with reciprocating movement to cyclically divert the compressed air to a pressurization plunger assembly 9A, 5, 9B that has a reciprocating movement within a pressure casing 20A, 20B, wherein said air pressure regulators 45, 46 are adjusted to regulate the passage of air to a first pressure and a second pressure.

20 Claims, 12 Drawing Sheets

AUTONOMOUS VALVE ASSEMBLY FOR THE REGULATION, DEPRESSURIZATION AND PRESSURIZATION OF PNEUMATIC EQUIPMENT

CROSS-REFERENCE TO RELATED APPLICATIONS

This application is the U.S. National Stage, pursuant to 35 U.S.C. §371, of International Application No. PCT/IB2011/001086, filed May 20, 2011, designating the United States, the contents of which are incorporated herein by reference.

STATE OF THE ART OF THE INVENTION

1. Field of the Invention

The current invention is related to the field of devices that are used in equipment that works with pneumatic pressure and where there's a need for regulation, such as the pressurization and depressurization of the pneumatic circuits, more particularly the invention refers to an autonomous valve assembly for the pressurization, depressurization and regulation of the pressure in a pneumatic circuit such as an inflation/disinflation circuit for the tires of a motor vehicle.

Although the present invention's main application will be in a circuit to maintain the pressure in the tires of a vehicle, it is evident that the invention can be applied to any circuit that controls the pressure of fluid in order to trigger different types of working equipment.

2. Description of the Prior Art

The different systems to maintain, increase, decrease and in general regulate the pressure in fluid circuits, such as pneumatic circuits are very well known in the field of the invention. These systems generally consist of valve assemblies and combinations that receive a pressurized fluid, for example air, and channel it through several valves and plungers that multiply the pressure received by the elevation system. These include, among others, valve bodies with pressure regulators that are connected to a source of pressure, for example a pressurized air tank, and the pressurized air passes through the different valves, causing the cyclical movement of some of the pistons, spool valves, etc. that guide the fluids to other pistons and plungers that pressurize the fluid in order to obtain a greater pressure in the fluid at the outlet of the elevation system than there was at the inlet.

Among said valve assemblies is the elevation system described in the Patent EP 1265761 B1 and U.S. Pat. No. 6,269,691, which refer to an automatic inflation system for the tires of motor vehicles. This elevation system consists of a combination of spool valves and retention valves with reciprocating movement whose coordinated movements are complex to be maintained efficiently. In general, the components such as the pistons or spool valves lock up or do not repeat their cycle continuously if their design is not appropriate.

The patent application Ser. No. 12/65,761, presented on 17 Mar. 2000, and granted on 7 Aug. 2001 reveals a pressure elevation system for compressed air installations that are used to maintain pressure in the tires of a motor vehicle. This elevation system contains a device with an air inlet that is connected to a source of compressed air of the vehicle, an air regulator which presents said compressed air inlet, a valve body which is connected to said regulator and that receives compressed air from the source and that includes an air-diverting plunger that moves reciprocatingly in order to cyclically divert the compressed air through the ducts to an air compression chamber which contains compressing plunger assembly which has been arranged to move reciprocatingly within the compression chamber and defines external and internal compression chambers, to compress the air provided in said air intake and increase the pressure to a level that is higher than at said intake. This compressing plunger assembly consists of a rod that contains plungers on both ends that move sealedly within said air compression chamber, and said rod is mounted within said valve body which furthermore has inlet valves to channel the compressed air and outlet valves to release the air that has been used to compress the air whose pressure needs to be increased. The valve body also presents valve plungers to cyclically route the air towards said diverter plunger in order to make said diverter plunger move cyclically with reciprocating movement.

The above-mentioned elevation system shows several functional faults. For example, this well-known elevation system presents an air compression plunger with a rod that causes the decompression of the escape chamber through an orifice that is connected to the inlet pressure, i.e. with an air inlet orifice between the regulator and the valve body.

Furthermore, the decompression of the elevation system's compression chambers is achieved by means of an orifice that is located in the casings of the diverter plunger to lead the air out into the atmosphere. This causes faults in the cyclical operation of the diverter plunger which eventually lock up. Consequently, this known elevation system incorporates a lever on the casing and pressurization chamber that is used to move the diverter plunger.

However, the valve plungers of the known system are moved by the force of the pressurization plungers but return to their previous position. Therefore, if this movement happens very quickly, not enough air enters to move the diverter plunger, as a result of which the plunger stays in the same position and when this happens it is necessary to use the previously mentioned lever.

Nonetheless, it is worth mentioning that in the elevation systems of the same kind that are known in the art, the inlet and outlet valves are located on the casings of the pressurization chambers, and the rod of the pressurization plunger assembly presents decompression orifices, which generates the same above-mentioned problem, i.e. the diverter plunger locks up and the equipment stops functioning.

In the above-mentioned and other assemblies for the regulation and increase of pressure for the inflation of automotive transport tires, electrical or electronical circuits, electronical contacts, connection cables, etc. to guarantee the power supply of the equipment and to provide the operator or driver of the vehicle with the necessary visual or auditive indications about the correct operation of the regulation elevation equipment. These circuits, obviously, make the installation of this equipment more expensive.

Another restriction for the pressure regulation and control equipment for automotive tires and other systems that use fluid pressure is that the equipment is adjusted for a single pressure regulation value.

Considering the regulation and pressure elevation systems that are described in the prior art and taking into account their deficiencies, it would be very convenient to have a new elevator-regulator that does not need extra energy for its operation, for example from power supply circuits, that also allows sufficient time to be able to move the valve plungers preventing that they return to the position they were in previously and locking them in their position, and that provides more than one established regulation pressure and is also safe and free of faults.

BRIEF DESCRIPTION OF THE INVENTION

Therefore, it is a goal of the present invention to provide a valve assembly for the regulation and pressure elevation in pneumatic equipment, as for example in systems or equipment to keep the tires of a vehicle inflated, being an autonomous assembly that does not need extra power supply, for example electrical energy, and it is capable of raising the pressure of the pneumatic system or equipment with at least 75%.

It is another objective of the current invention to provide an autonomous valve assembly for the regulation and elevation of the pressure in pneumatic equipment that present a valve body and an air regulator body with an compressed air intake connected to a source of compressed air, whereby the body presents two pressure regulators that regulate the pressure at a desired level and communicate it to an air diverter plunger with reciprocating movement to cyclically divert the compressed air to a pressurization plunger assembly that has a reciprocating movement within a pressure casing wherein said air pressure regulators are adjusted to regulate the passage of air to a first pressure and a second pressure.

It is yet another objective of the current invention to provide an autonomous valve assembly for the pressure regulation and elevation in pneumatic equipment, being an assembly of the type that contains an air regulation body with a compressed air inlet connected to a source of compressed air, a valve body that is connected to said regulation body to receive compressed air from it and that includes an air diverter plunger with reciprocating movement to cyclically divert the compressed air through the ducts to a pressurization plunger with a reciprocating movement within a pressure casing, defining internal and external pressurization chambers inside of which the compressed air from said air intake is compressed and the pressure is elevated above the pressure at the point of entry. Said pressurization plunger assembly includes a rod that is mounted slidingly within a duct of said valve body that runs through the valve body connecting said internal pressurization chambers, said rod having, at both ends, two pressurization plungers that slides sealingly within said air pressurization case, said rod being mounted slidingly over said valve body, and said valve body presenting inlet valves to channel the highly compressed air for its later usage and outlet valves to let the compressed air escape, and valve plungers to cyclically direct the air towards said diverter plunger to make said diverter plunger move cyclically with reciprocating movement, where said air regulation body contains a first compressed air regulator that is adjusted to a first pressure and a second compressed air regulator that is adjusted to a second pressure, whereby a selection switch is mounted between said regulators to activate one of them.

It is even another objective of the present invention to provide an autonomous valve assembly for the regulation and elevation of the pressure in pneumatic equipment, that presents a valve body and an air regulation body with a compressed air inlet connected to a source of compressed air, wherein the body presents two pressure regulators that regulate the pressure to a desired value and communicate it to an air diverter plunger with reciprocating movement to cyclically divert the compressed air towards a pressurization plunger assembly, said compressed air inlet being connected to a feed orifice that is connected to diversion orifices that are selectively connected to external and internal chambers of said diversion plunger, and said internal chamber of said diversion plunger are alternately connected to an orifice that feeds a power-generating turbine.

BRIEF DESCRIPTION OF THE DRAWINGS

For greater clarity and understanding of the objective of the current invention, it has been illustrated in several figures, where the invention has been represented in one of the preferred embodiments, all by way of illustration, wherein:

FIG. 2A shows an enlarged detail limited by the circle in FIG. 2;

DETAILED DESCRIPTION OF THE INVENTION

Referring now to the figures we see that the invention consists of an autonomous valve assembly for the pressure regulation and elevation in pneumatic equipment of an automotive vehicle, being an assembly of the type that comprises an air pressure regulation body 4 with a compressed air inlet 54 that is connected to a source of compressed air that has not been illustrated and can be any of the types known in the art. For example, this could be a tank of compressed air as is known in the art.

Figures 1, 1A, 1B:
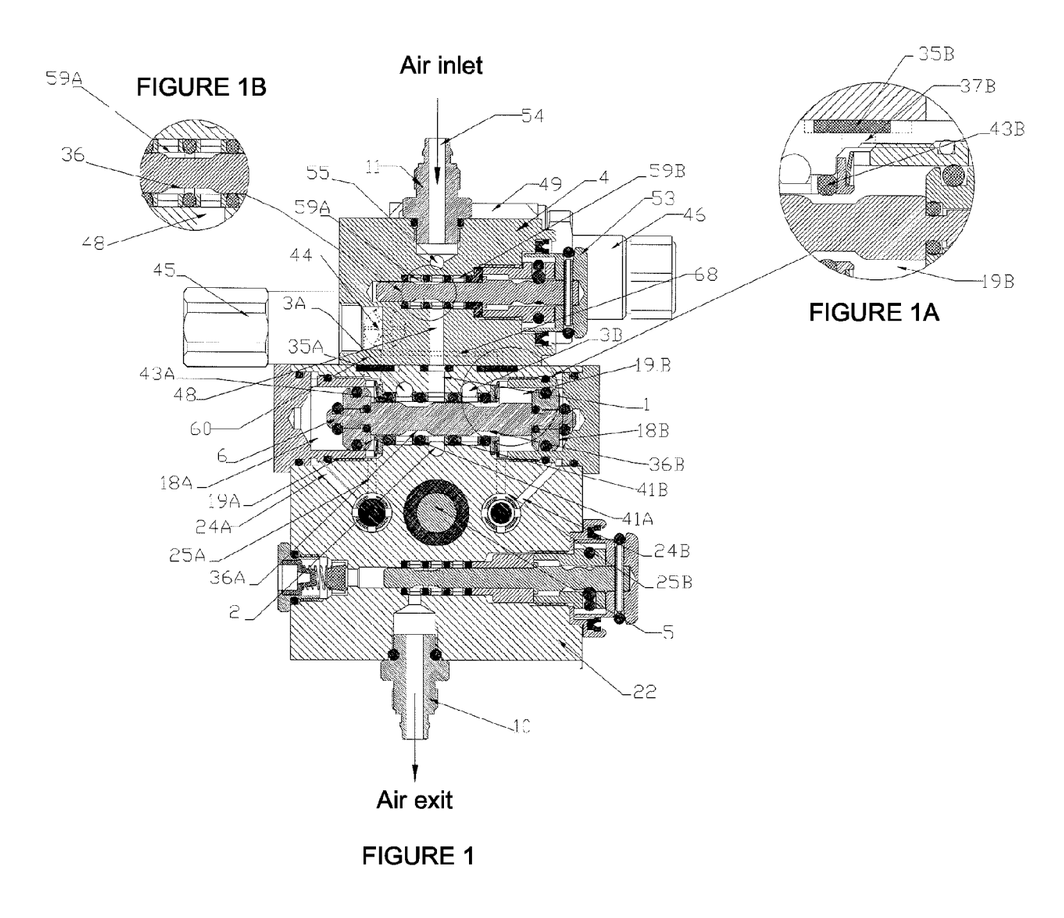
FIG. 1 shows a side-section view of the pressure elevation system in agreement with a preferred embodiment of the invention.
FIG. 1A shows an enlarged detail limited by the circle in FIG. 1.
FIG. 1B shows an enlarged detail limited by the circle in FIG. 1.
Figure 5:
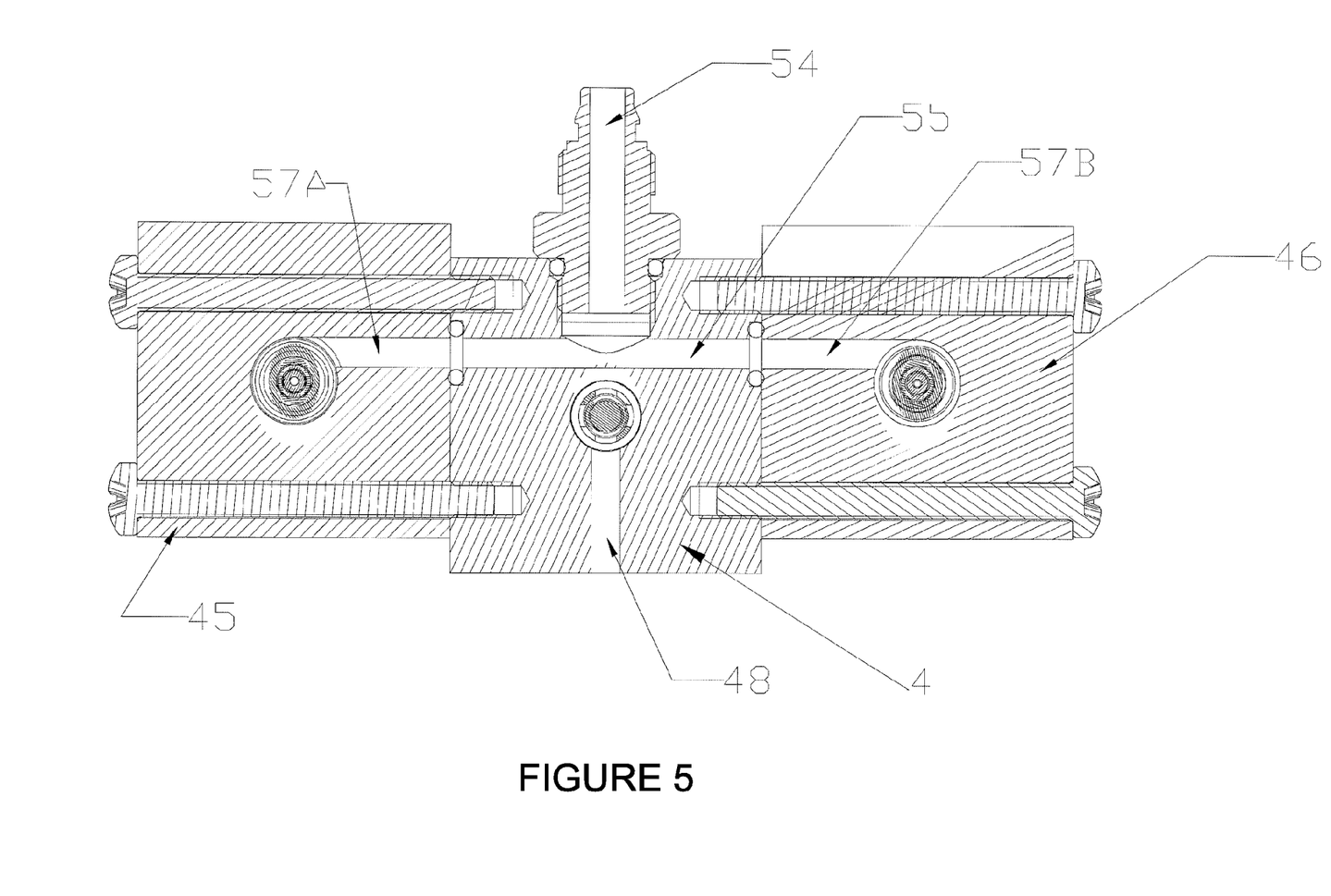
FIG. 5 shows a side-section view of the pressure elevation assembly in FIG. 3, at the level of the pressure regulators and the selection switch and rotated by 90° with respect to the section in FIG. 3.

FIG. 1 shows that the compressed air from said tank enters through the orifice or inlet 54 through an input socket 11 threaded onto the valve body or the regulation body 4. This body 4 presents an orifice 55 that is extended transversally to the orifice 54, as can be seen more clearly in FIG. 5, and that connects the two inlet orifices 57A and 57B, which correspond to pressure regulators 45 and 46 respectively.

Figure 3:
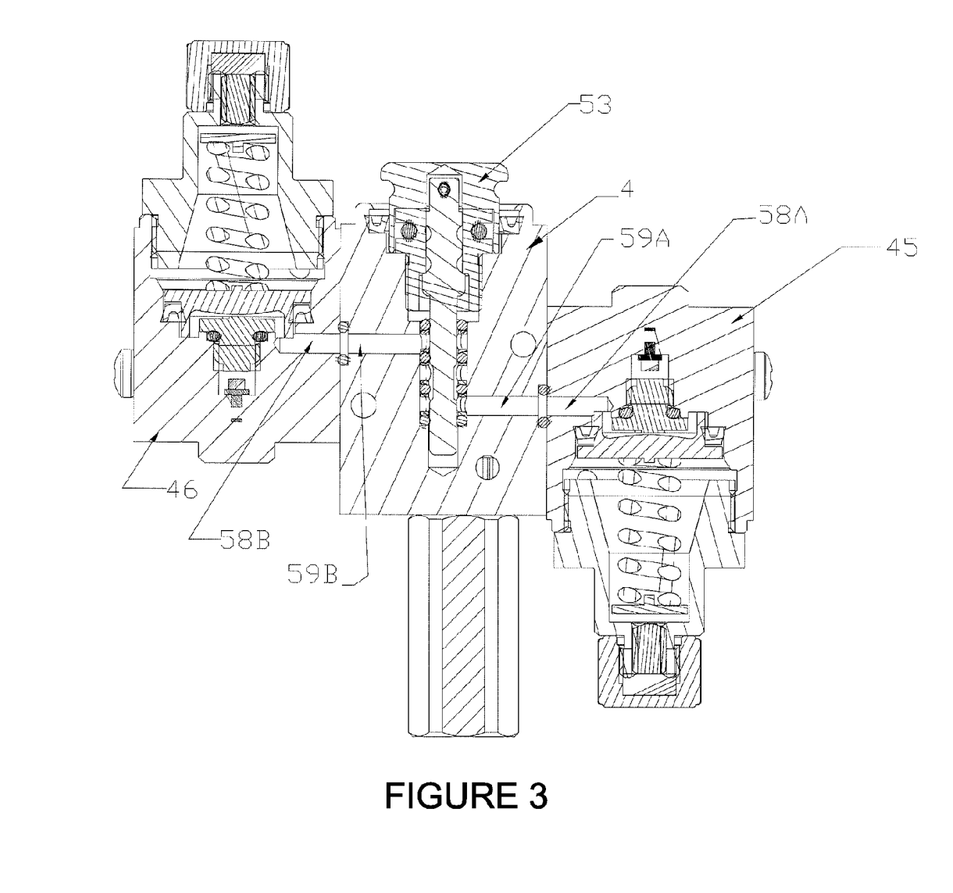
FIG. 3 shows a side-section view of the pressure elevation assembly in FIG. 1, at the level of the pressure regulators and the selection switch and rotated by 90° with respect to the section in FIG. 1.
Figure 4:
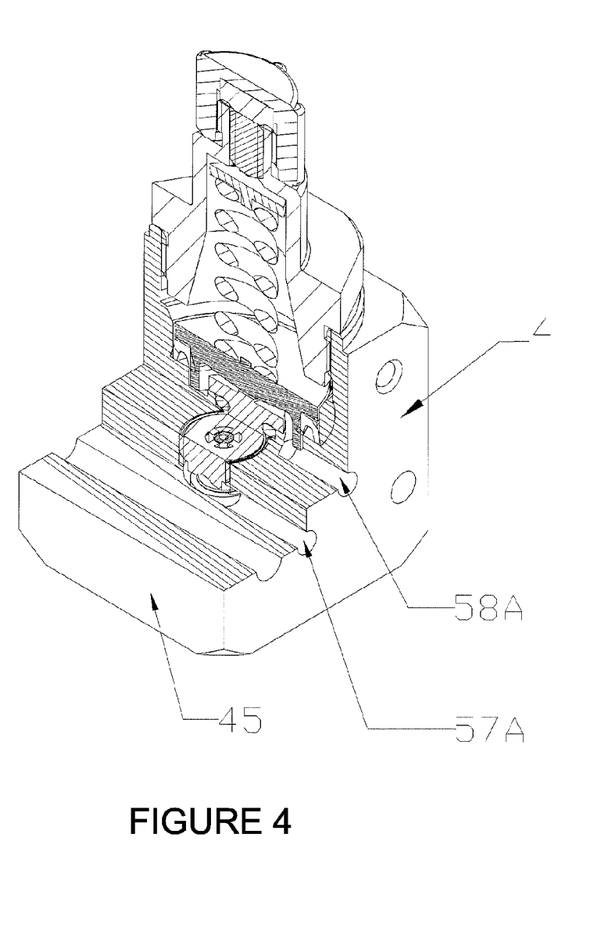
FIG. 4 shows a perspective cut-away view of one of the pressure regulators.

In FIG. 4 it can be observed that the air that enters orifice 57A passes through the regulator 45 until it reaches orifice 58A. It is worth mentioning that these two regulators 45 and 46 are constantly under air pressure, as they are interconnected through orifice 55 which can be located on body 4 of the regulators. Once the compressed air passes through orifice 58A, it has the pressure to which the regulator has been set, entering once again the body 4 through orifice 59A, as can be observed in FIG. 3.

Body 4 also includes a selection switch 53 in order to switch the compressed air from inlet 54 to one of the regulators 45, 46. In accordance with FIG. 1, the position of the selection switch 53, the compressed air that comes from the outlet orifice 59A or 59B is only connected to the feed orifice 48, because in this position the axle or rod of the switch or knob 53 has a switching groove 36, which allows for both orifices 59A and 48 to connect, see FIG. 1B. In other words, in this position of FIG. 1 only the air pressure which has been regulated through regulator 45, shall pass through.

Figure 2:
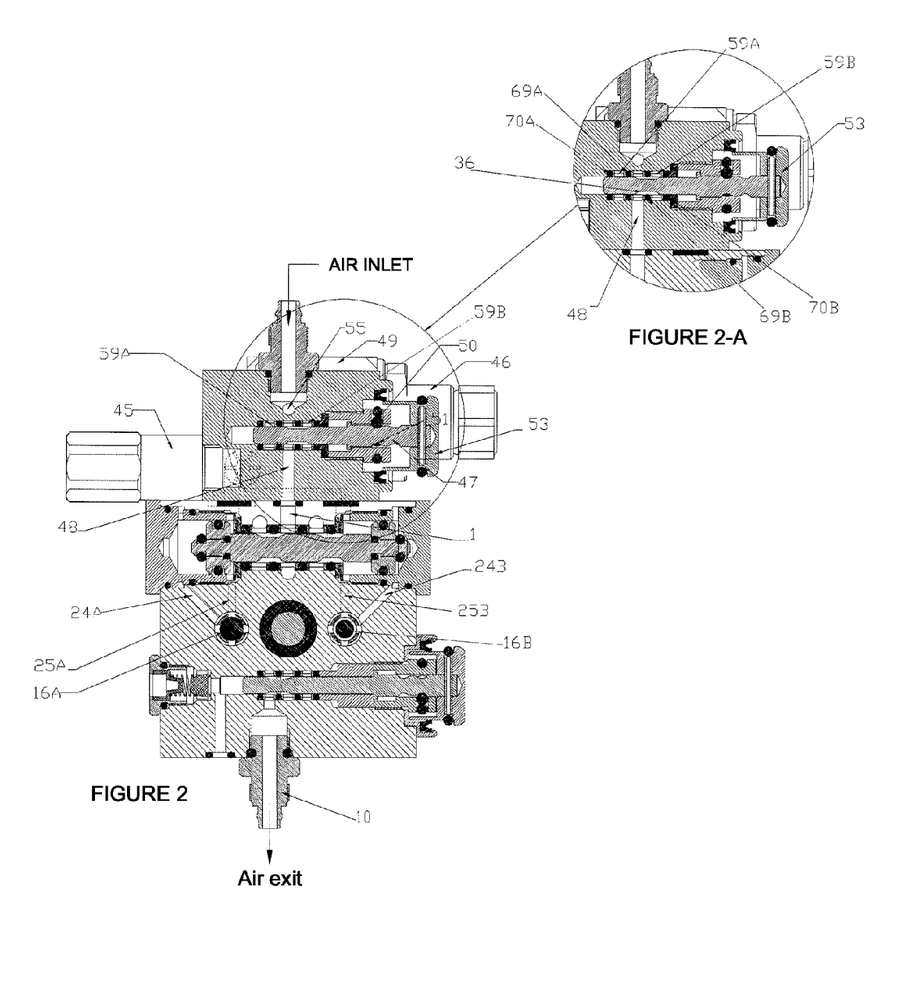
FIG. 2 shows a side-section view similar to that of FIG. 1 but with the switch in another position.

If we want to feed the assembly with a different air pressure, the selection switch 53 is moved to the position shown in FIG. 2, then the pressure that is present in orifice 48 will be the pressure that is found in the regulator 46. This happens because when the knob is moved in order to change the state, the groove 36 from the knob axle will be in another position where it is retained using a ball 50. It is worth mentioning that the separation that keeps the orifices 59A and 59B with the orifice 48, is adequately sealed using o'rings or toroidal seals 70A and 69A, as can be seen better in FIG. 2A.

Once the pressurized air is moving through orifice 48, it moves towards a duct or orifice 1 on the valve body 22. Orifice 1 is connected continuously with orifice 2, and alternately with diversion orifices 3A or 3B, according to the position of the diversion plunger 6. For example, in FIG. 1 we can see that orifice 1 is connected to orifice 3A.

The valve body 22 contains the seals 41A and 41B that seals the connection between the orifices 3A or 3B so these orifices are never connected to each other. Orifices 3A and 3B connect the Chambers 8A and 8B, and the orifice 2 connects chambers 7A and 7B continuously.

The valve body 22 also contains seals 43A and 43B, which prevent the air that comes from orifice 1 from reaching the chambers 19A and 19B that can be observed in FIG. 1.

Figure 6:
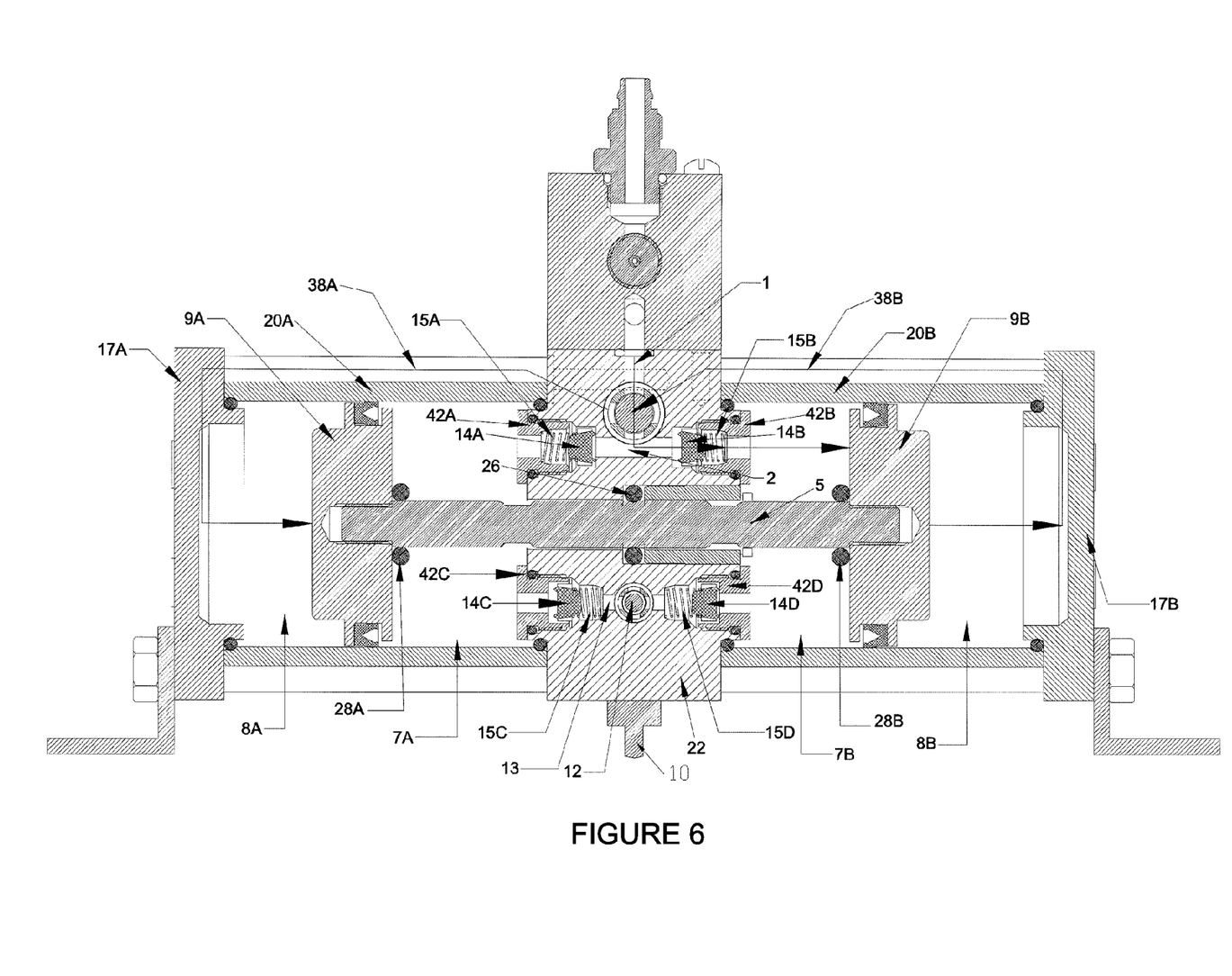
FIG. 6 shows a side-section view of the pressurization plunger assembly according to the invention.

In FIG. 6 it can be observed that the air from orifice 3A is led through the internal part of casing 20A, through the schematically illustrated orifice 38A, continuing to a cover 17A that is fixed to the casing 20A, hereby allowing the air to reach chamber 8A. Once the air enters chamber 8A, pressure is applied on the surface of a plunger or piston 9A, allowing for the plunger and all of its assembly to move to the right, as can be observed in FIG. 6. The plunger 9A forms part of the pressurization plunger assembly composed by a rod 5 and a pair of plungers 9A and 9B.

Orifice 2 distributes the air over the spring-charged (15A and 15B) inlet plungers 14A or 14B that are extended within the valve body 22, between the internal pressurization chambers 7A and 7B. In the case of FIG. 6, the air moves plunger 14B considering that the pressure within chamber 7A applies pressure on plunger 14A. The air pressure in chamber 7A is greater than the pressure that comes in through orifice 2, moving plunger 14B and consequently overpowering spring 15B. Under these conditions, the air will enter chamber 7B and will be compressed. This compression happens because the volume of the air that is present inside of the chamber 7A decreases which causes the pressure within this enclosure to increase, reaching up to 75% above the entry pressure.

Also in FIG. 6 it can be observed that the valve body 22 contains two plungers, called escape plungers 14C and 14D, which are responsible for letting out the compressed air. This air outlet is achieved as the plunger and its entire assembly 9A, 5, 9B is moved. In the case of FIG. 6, the plunger 14C has been moved and the plunger 14D rests on nut 42D. This is caused by the fact that the pressure that exists within chamber 7A is greater than the pressure that exists in chamber 7B.

Figure 12:
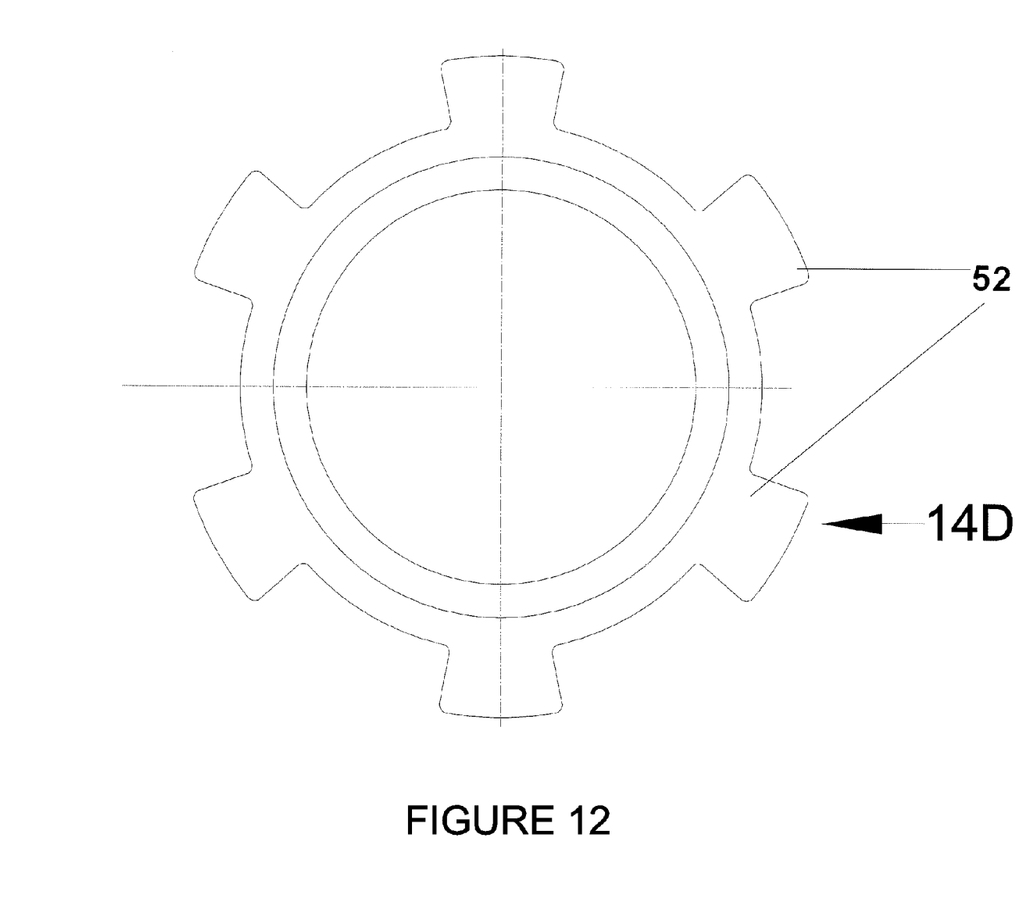
FIG. 12 shows a view from one end of a plunger of the inlet and outlet valves of the pressurization plunger assembly, where the blades for support of the plunger and passage of the fluid can be seen.

It is important to mention that plungers 14A, 14B, 14C and 14D present a small lip that allows for adequate sealing against the respective assembly nut 42C and 42D, as well as the surface of valve body 22. The plungers 14A, 14B, 14C and 14D present blades 52, which can be observed in FIG. 12, in such a way that when the plungers rest against their orifices within the valve body 22, they let through the air and do not block its exit.

Between plungers 9A and 9B we find seals 28A and 28B, which are located on the surface of rod 5, that are buffer seals to absorb the impact of the plungers against the valve body 22. It can also be seen in FIG. 6 that when chamber 8B starts reducing its volume, with reference to what has been described before, the air pressure that exists in its interior will move towards an orifice of the cover 17B which in turn is connected to an orifice 38B in casing 20B, hereby causing orifice 38B to connect with orifice 3B.

In order to follow the circuit, it is convenient to return to FIG. 1 where it can be observed that orifice 3B is connected to the inner chamber 19B associated to the end of plunger 6, consequently, the air pressure that is found in chamber 8B will reach inner chamber 19B. Therefore, to be able to decompress chamber 19B, as can be seen in FIG. 1, the plunger 6 shows a groove 36B, of a pair of grooves 36A and 36B, which allows the air to enter through orifice 37B, as can be seen in FIG. 1A.

Consequently, as the air pressure inside of chamber 19B is greater than the atmospheric pressure, the air passes through orifice 68, which is connected to orifice 60, from which the air moves towards turbine 44. The air that comes out of orifices 60 and 68 works on the blades (not illustrated) of turbine 44 and it starts to rotate, hereby generating a small amount of current as the turbine is connected to a generator (not illustrated). In other words, every time the turbine rotates, electrical current is produced (electric pulse) which feeds a led or indicator light, providing visual confirmation that the equipment is functional. It is worth mentioning that this is very important in comparison with known equipment as this piece of equipment is autonomous, i.e. it produces its own electrical energy, without the need for a cable or electronic board to see if the equipment is working. Turbine 44 is not illustrated in retail because it can be anyone of a variety of small compressed air-driven turbines, the same is true for the generator.

Figures 7, 7A, 7B:
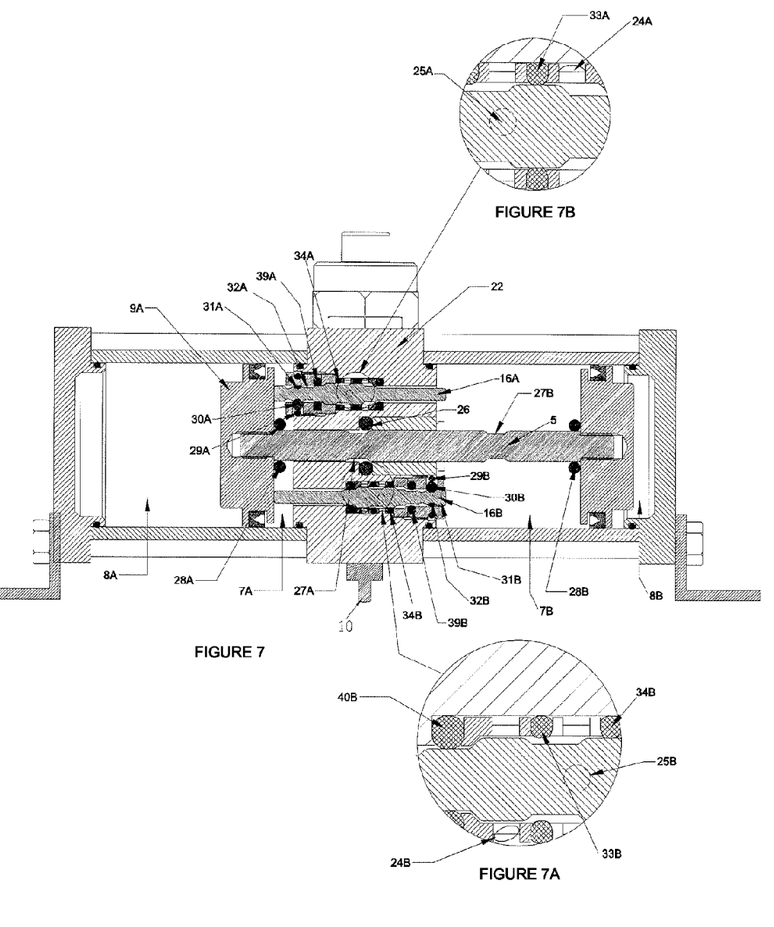
FIG. 7 shows a side-section view of the pressurization plunger assembly of FIG. 6 but in another working position.
FIG. 7A shows an enlarged detail limited by the circle in FIG. 7.
FIG. 7B shows an enlarged detail limited by the circle in FIG. 7.

In FIG. 7, the valve body 22 also includes two valve plungers 16A and 16B that are outphased by 180 degrees and, with respect to the valve body 22, are parallel to the plungers 14A, 14B, 14C and 14D but rotated 90° compared to FIG. 6. In agreement with FIG. 7, it can be observed that when the lower surface of the plunger 9A rests on the plunger 16A and 16B and the air pressure continues to enter into chambers 8A and 7B, plungers 16A and 16B are moved. This movement is produced exactly, as valve body 22 and plungers 16A and 16B show peripheral grooves that fit respective balls and the plungers are not mounted under a load that returns them to their original position. For the case of plunger 16A we find ball 30A which rests on groove 31A, while on plunger 16B we can observe ball 30B that fits in groove 31B. In FIG. 7A we can also observe that seal 40B blocks the air from entering into the valve body 22, through orifice 24B and plunger 16A, through orifice 25B.

Another important aspect of the invention is that rod 5 presents grooves 27A and 27B that allow for the depressurization of chamber 7A when plunger 9A comes very close to the surface of valve body 22, and the pressure in chamber 7A is greater than that of chamber 7B. This is caused by the fact that the air passes through the grooves 27A, as can be seen in FIG. 7. This guarantees the changes of state of the plungers 16A and 16B, respectively. Finally, an o'ring 26 is placed in order to avoid connection between chambers 7A and 7B, as one chamber compresses and the other receives the air that comes from orifice 2.

However, the valve plunger 16A has a bigger section on the side of the internal chamber 7B than that on the side of chamber 7A. The objective of this difference is that when the pressure increases in chamber 7B, it does not move plunger 16A.

Figure 8:
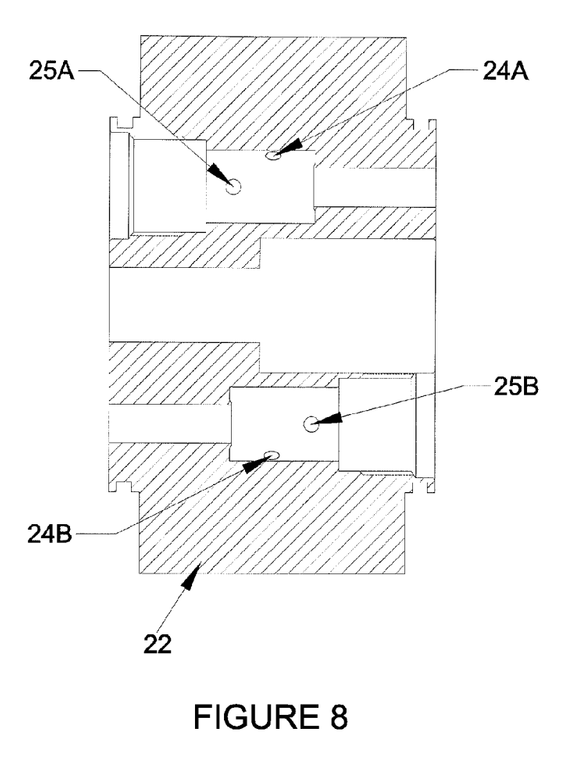
FIG. 8 shows a side-section view of the valve body at the level and in the longitudinal field of the pressurization plunger assembly but without said plunger's components.

As can also be seen in FIG. 7B, a seal 33A is provided which prevents the orifices 24A and 25A from connecting as this connection should not be made in agreement with the position of plunger 16A that is shown in FIG. 7. However, in FIG. 7A, it can be observed that seals 40B and 34B prevent the chambers 7A and 7B from connecting, but orifices 25B and 24B are connected. A section of valve body 22 is represented in FIG. 8, where the orifices 24A, 24B, 25A and 25B can be observed.

Figures 9, 9A, 9B:
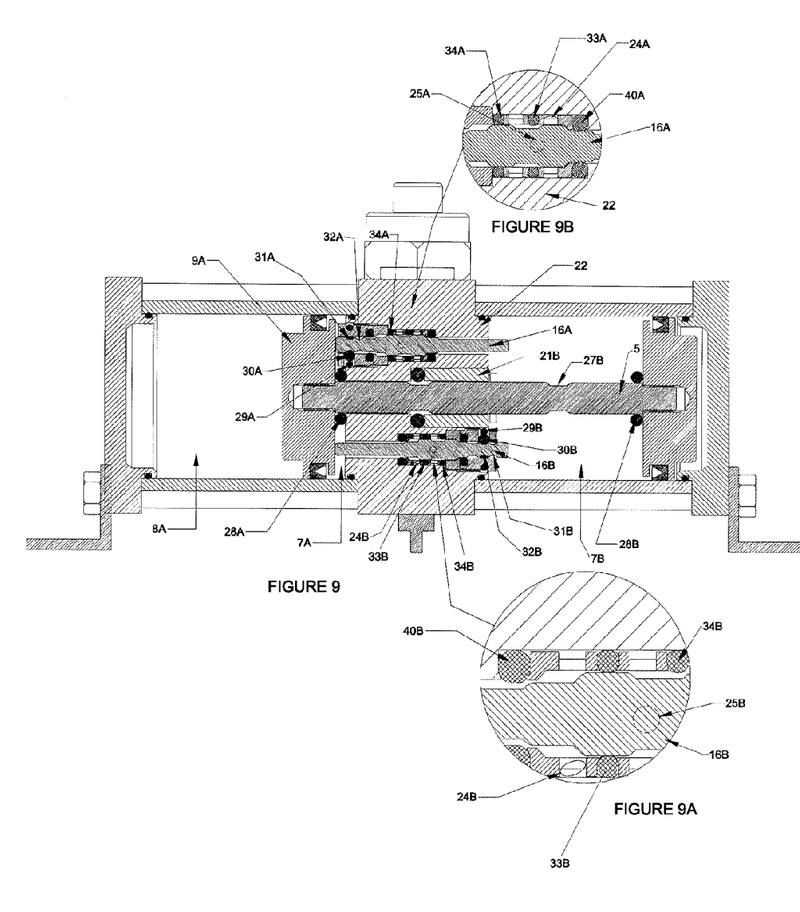
FIG. 9 shows a side-section of the pressurization plunger assembly of FIGS. 6 and 7 but in another working position.
FIG. 9A shows an enlarged detail limited by the circle in FIG. 9.
FIG. 9B shows an enlarged detail limited by the circle in FIG. 9.

In FIG. 9 we can observe that the plungers 16A and 16B have been moved from the position illustrated in FIG. 7. This movement occurs as a result of the pressure applied by plunger 9A, thanks to the air pressure that has entered chamber 8A, as well as chamber 7B.

FIG. 9B shows that plunger 16A is not connected to chambers 7A and 7B. This is due to the fact that the plunger 16A is sealed by the valve body 22, i.e. using the seals 34A and 40A. Furthermore, the orifice 25A is connected to chamber 19A, as can be seen in FIG. 1, where the air is blown towards orifice 60 and continues on towards turbine 44, as described previously in what happened when the air was located in the internal chamber 19B. The orifice 25A is connected to the orifice 24A and this orifice 24A in turn is connected to the external chamber 18A. When observing FIG. 1, it can be seen that the depressurization of the external chamber 18A is possible thanks to the fact that orifices 24A and 25A are connected, and where orifice 25A is connected to chamber 19A.

In FIG. 9A it can be observed that, as a result of the movement of plunger 16B, the air that is located inside chamber 7A will move to the interior of the valve body 22 and the plunger 16B, hereby avoiding that in this position the seal 40B blocks the entry of air and allowing the air to enter freely towards opening 24B. As a result of the movement of plunger 16B, the seal 33B closes off the passage of air that is moving towards orifice 25B, hereby avoiding any connection between openings 24B and 25B. The air that comes in through orifice 24B moves into chamber 18B, hereby moving the plunger 6 and closing orifice 3B and opening orifice 3A, as can be seen better in FIG. 1.

Consequently, this way a cycle is completed which from now on will be repeated as described while the states of the different components change. Once the compressed air comes out and overpowers plungers 14C and 14D (which, in agreement with FIG. 6, corresponds to 14C), passes through the outlet orifice 13, where it is connected to pressurization orifice 12.

Figures 10, 10A:
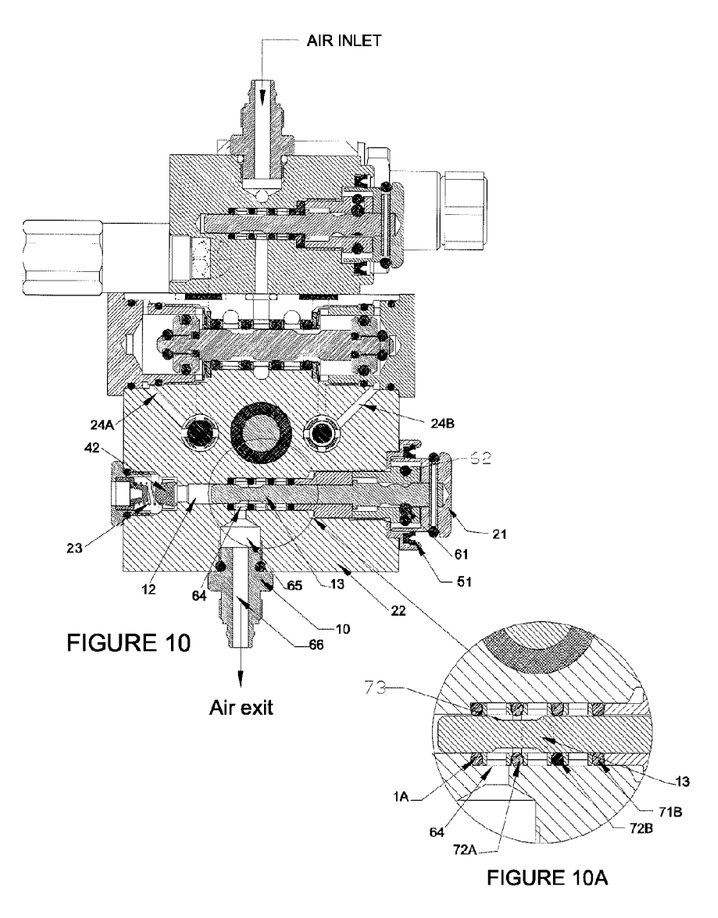
FIG. 10 shows a side-section view similar to that of FIG. 1 but with the switch in another position.
FIG. 10A shows an enlarged detail limited by the circle in FIG. 10.

In agreement with FIG. 10, orifice 12 is connected to a second outlet selection switch or knob 21, which is in the position that allows the air that comes out of orifice 13 to pass through groove 73, which can be seen in FIG. 10A, corresponding to switch or knob 21, and is connected to orifice 64 which is connected to a connector 10 that fits on the tubing that will lead the compressed air to the inflation system or equipment, for example a tire. FIG. 10A shows o'rings 71A and 72B that seal off in such a way that orifice 13 and orifice 64 remain connected, as can be seen in FIG. 10.

Figures 11, 11A:
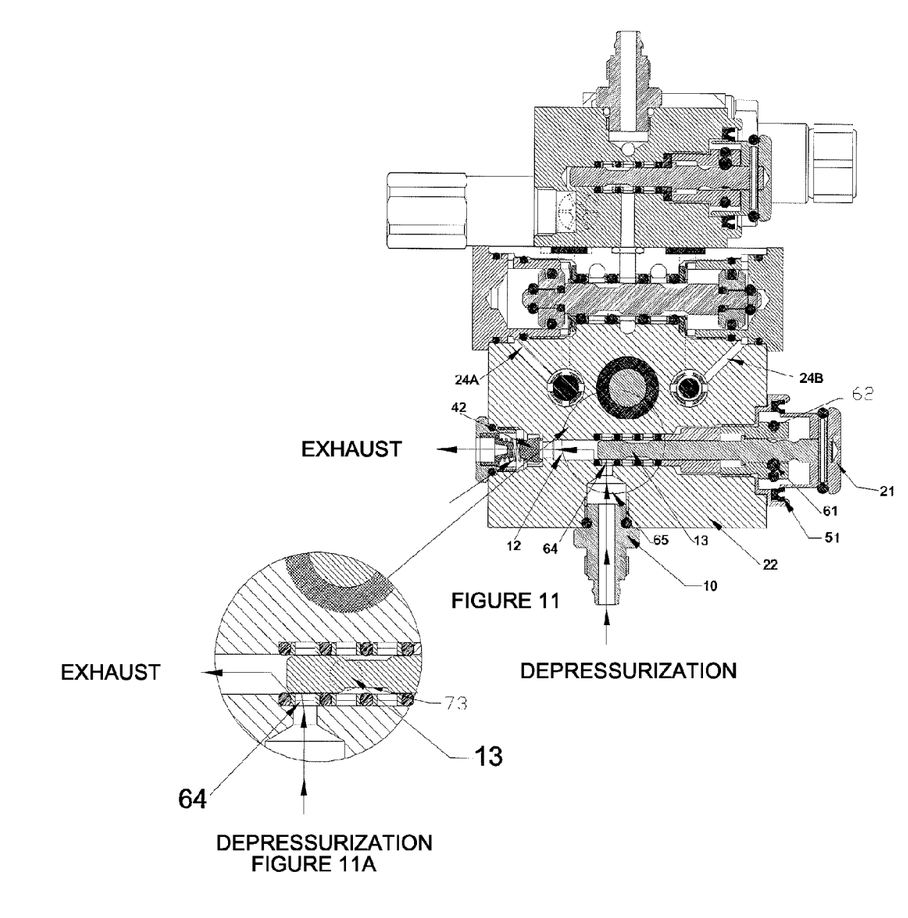
FIG. 11 shows a side-section view similar to that of FIG. 10 but with the depressurization knob in another position.
FIG. 11A shows an enlarged detail limited by the circle in FIG. 11.

For example, if the switch or knob 21 is in the position that is shown in FIG. 11, it can be said that the state of the switch has changed and it is located on the second groove of the switch on the ball. Therefore, in this position, it can be observed that orifice 64 is connected to the orifice of plunger 42. As the network pressure is higher than the atmospheric pressure, the pressure overpowers spring 23, and as a result plunger 42 is moved, causing the air in the tubing to come out into the atmosphere, i.e. depressurization occurs. Finally, the o'ring 44 is used to avoid the entry of dirt into the pneumatic system.

Operation of the Valve Assembly in a Tire Pressurization Circuit

During operation of the valve assembly of the invention, the air comes from a compressor or tank and comes in through inlet 54 of connector 11. At the beginning, regulator 46 is supposed to be adjusted for an outlet pressure (after exiting the elevator, it should be 75% less) of 130 psi, and that regulator 45 is set for a pressure of 80 psi (same condition as regulator 46). Also, the tire pressure is supposed to be 80 psi, and consequently the switch or knob 53 should be rotated, as illustrated in FIG. 2, in such a way that the pressure that enters orifice 48 and continues on to the pressure elevation components, comes from orifice 59B, i.e. the pressure that has passed through regulator 46.

As the elevator increases the pressure to the network from 80 psi to 130 psi, it is operational and the outlet pressure, proper to the elevator, would alternately pass through orifices 60 and 68, which cause turbine 44 to rotate, this way generating a proper current feeding a led that indicates the equipment is functioning. This item is very important, as this makes the equipment autonomous, i.e. it does not need any type of additional external current for its operation.

When the equipment reaches a pressure of 130 psi, the equipment would no longer need to be operational and the led or indicator light would switch off. Nonetheless, in case one of the tires in the network is punctured or ruptured when the pressure is lowered from 4 to 7 psi [sic], in agreement with the established pressure, then the regulation-elevation assembly of the invention will start functioning again, causing the turbine 44 to start rotating again and the light to switch on, hereby calling the attention of the driver of the vehicles to the existence of a problem in one of the tires or in the network.

It can be assumed that the user has a pressure of 130 psi in the tires and needs to bring it to 80 psi. He will need to perform the following stops:

First he needs to depressurize the system's tubing by pulling the switch 21, as can be seen in FIG. 11, in order to release the air from the tubing into the atmosphere through orifice 12 by overpowering plunger 42.

Then, he should return the switch 21 to the position that is shown in FIG. 10. Once the switch is returned to this position, he should pull the selection switch or knob 53, and place it in the position that is shown in FIG. 1, hereby allowing the pressure from regulator 45 to enter orifice 48, and the air that exits the elevator will be at 80 psi, causing the system's inflation valve to operate, which would work at that pressure.

This way, the elevation assembly would work and indicate that it is functioning by generating autonomous current, until the established pressure is obtained, 80 psi in this case.

The above is also obtained thanks to the fact that the assembly of the current invention can be combined with a valve known as "Improvement in pressure-controlled three-way valve device", explained in Patent Application PCT/IB2009/053017, of the same holder as the current, in such a way that the current valve assembly inflates and keeps the pressure after a perforation, the disinflation of the tire pressure also being a possibility.

For example, the trailer of a truck tractor has a tank with compressed air which inflates the tires without the need for electric energy. In the event of a perforation of the tire in stationary position, i.e. when the semi is detained, this could continue inflating until the pressure of the tank drops below 80 psi. It could also be visualized by means of a led to show that the equipment is working.

Another characteristic of the current valve assembly is that, depending on the perforation of the tire or pneumatic system that the equipment is connected to, the driver will be able to get an idea of the magnitude of the loss or perforation. The bigger the air discharge, the faster the turbine will rotate, which will increase the on/off frequency of the light indicator.

Having specifically described and determined the nature of the current invention and the way in which it should be brought into practice, the following claims are considered exclusive property and right:

1. An autonomous valve assembly for the regulation and elevation of the pressure in pneumatic equipment, being an assembly of the type that comprises an air-regulating body with an compressed air inlet, connected to a source of compressed air, a valve body connected to said regulating body to receive compressed air from said air-regulating body and which includes an air-diverter plunger with reciprocating movement to cyclically divert the compressed air through connection ducts to a pressurization plunger assembly with reciprocating movement within a pressurization casing defining external pressurization chambers and internal pressurization chambers, inside of said pressurization casing the compressed air provided in said air inlet is compressed and the pressure is elevated above the pressure at a point of entry, said pressurization plunger assembly including a rod that is slidingly mounted within a duct of said valve body, wherein said duct crosses the valve body, connecting said internal pressurization chambers, presenting said rod, at its ends, two pressurization plungers that sealingly slide within said air pressurization casing, said rod being slidingly mounted using said valve body, said valve body having inlet valves, to channel the highly-compressed air for its posterior usage and outlet valves for the outlet of the air whose pressure has been increased, and valve plungers, to cyclically direct the air towards said diverter plunger to make said diverter plunger move cyclically with reciprocating movement, an elevator being characterized by: said air regulation body consisting of a first air pressure regulator adjusted to a first pressure and a second air pressure regulator adjusted to a second pressure, being mounted between said pressure regulators a selection switch to activate one of the two pressure regulators.

2. A valve assembly of claim 1, characterized by the fact that said air inlet is connected to an inlet orifice at said first regulator and an inlet orifice at said second regulator, and said first and second pressure regulators each present an outlet orifice that is connected with said selection switch which defines a switch between said outlet orifices of the regulators and a feed orifice that leads to said diverter plunger.

3. A valve assembly of claim 2, characterized by said feed orifice also being connected to diverter orifices, that are selectively connected with external chambers, and internal chambers of said diverter plunger.

4. A valve assembly of claim 3, characterized by the fact that said internal chambers of said diverter plunger are alternately connected to an orifice that feeds an energy-generating turbine.

5. A valve assembly of claim 4, characterized by the fact that one of said diversion orifices, is connected to one of the external pressurization chambers and one of said internal pressurization chambers of said pressurization plunger assembly, and the other of said diversion orifices, is connected to one of said external pressurization chambers and one of said internal pressurization chambers of said pressurization plunger assembly.

6. A valve assembly of claim 2, characterized by said selection switch being mounted movably on said regulator body and presenting external seals and at least one switching groove that is connected selectively with one of said outlet orifices of said first and second pressure regulators.

7. A valve assembly of claim 6, characterized by said selection switch being movably mounted between two positions where the selection switch is retained by a 50-size ball.

8. A valve assembly of claim 1, characterized by said duct that crosses the valve body and through which said rod slides, presents a ventral o-ring that seals against said rod preventing the connection between said internal pressurization chambers and said rod presents two peripheral grooves which have an external diameter that is inferior to said o-ring connecting said internal pressurization chambers through said conduct whereto said rod slides.

9. A valve assembly of claim 1, characterized by said valve body presenting a pressurization orifice that on one end is connected to said outlet valves from which the valve body receives the compressed air, and on the other end is connected to an outlet selection switch that is selectively connected with an atmospheric outlet and with an outlet connector for compressed air towards the pneumatic equipment.

10. A valve assembly of claim 6, characterized by an atmospheric outlet comprising a spring-charged valve.

11. A valve assembly of claim 3, characterized by said selection switch being mounted movably on said regulator body and presenting external seats arid at least one switching groove that is connected selectively with one of said outlet orifices of said first and second pressure regulators.

12. A valve assembly of claim 4, characterized by said selection switch being mounted movably on said regulator body and presenting external seals and at least one switching groove that is connected selectively with one of said outlet orifices of said first and second pressure regulators.

13. A valve assembly of claim 5, characterized by said selection switch being mounted movably on said regulator body and presenting external seals and at least one switching groove that is connected selectively with one of said outlet orifices of said first and second pressure regulators.

14. A valve assembly of claim 2, characterized by said duct that crosses the valve body and through which said rod slides, presents a ventral o-ring that seals against said rod preventing the connection between said internal pressurization chambers and said rod presents two peripheral grooves which have an external diameter that is inferior to said o-ring connecting said internal pressurization chambers through said conduct whereto said rod slides.

15. A valve assembly of claim 3, characterized by said duct that crosses the valve body and through which said rod slides, presents a ventral o-ring that seals against said rod preventing the connection between said internal pressurization chambers and said rod presents two peripheral grooves which have an external diameter that is inferior to said o-ring connecting said internal pressurization chambers through said conduct whereto said rod slides.

16. A valve assembly of claim 4, characterized by said duct that crosses the valve body and through which said rod slides, presents a ventral o-ring that seals against said rod preventing the connection between said internal pressurization chambers and said rod presents two peripheral grooves which have an external diameter that is inferior to said o-ring connecting said internal pressurization chambers through said conduct whereto said rod slides.

17. A valve assembly of claim 2, characterized by said valve body presenting a pressurization orifice that on one end is connected to said outlet valves from which the valve body receives the compressed air, and on the other end is connected to an outlet selection switch that is selectively connected with an atmospheric outlet and with an outlet connector for compressed air towards the pneumatic equipment.

18. A valve assembly of claim 3, characterized by said valve body presenting a pressurization orifice that on one end is connected to said outlet valves from which the valve body receives the compressed air, and on the other end is connected to an outlet selection switch that is selectively connected with an atmospheric outlet and with an outlet connector for compressed air towards the pneumatic equipment.

19. A valve assembly of claim 4, characterized by said valve body presenting a pressurization orifice that on one end is connected to said outlet valves from which the valve body receives the compressed air, and on the other end is connected to an outlet selection switch that is selectively connected with an atmospheric outlet and with an outlet connector for compressed air towards the pneumatic equipment.

20. A valve assembly of claim 5, characterized by said valve body presenting a pressurization orifice that on one end is connected to said outlet valves from which the valve body receives the compressed air, and on the other end is connected to an outlet selection switch that is selectively connected with an atmospheric outlet and with an outlet connector for compressed air towards the pneumatic equipment.

* * * * *